UNITED STATES PATENT OFFICE.

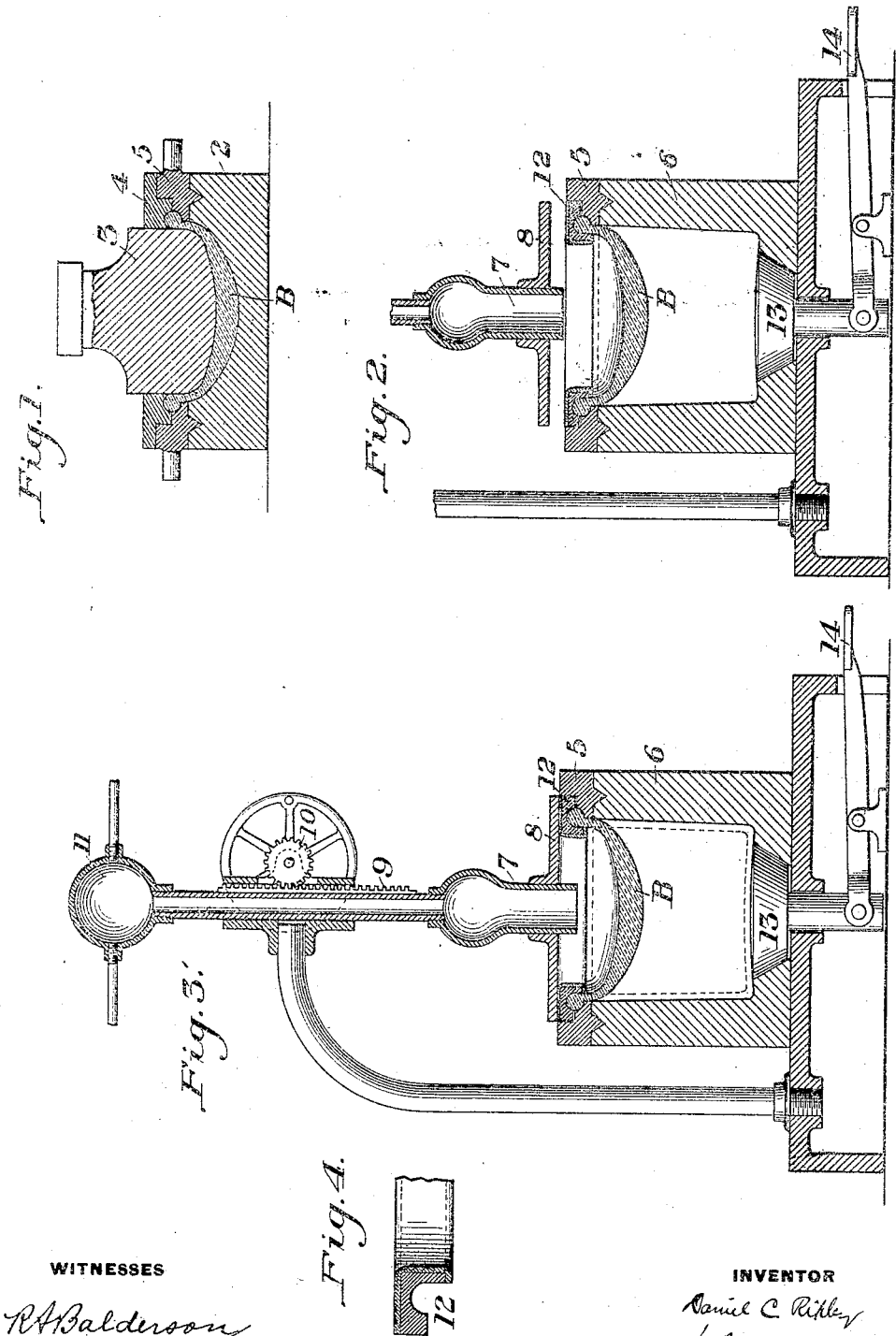

DANIEL C. RIPLEY, OF PITTSBURG, PENNSYLVANIA.

METHOD OF AND APPARATUS FOR THE MANUFACTURE OF HOLLOW ARTICLES OF GLASSWARE.

No. 832,212.　　　　　Specification of Letters Patent.　　　　　Patented Oct. 2, 1906.

Application filed December 6, 1905. Serial No. 290,557.

*To all whom it may concern:*

Be it known that I, DANIEL C. RIPLEY, of Pittsburg, Allegheny county, Pennsylvania, have invented a new and useful Method of and Apparatus for the Manufacture of Hollow Articles of Glassware, of which the following is a full, clear, and exact description, reference being had to the accompanying drawings, forming part of this specification, in which—

Figure 1 is a sectional view of the preliminary mold in which the blank is shaped. Fig. 2 is a similar view of the final mold. Fig. 3 is a sectional elevation of the apparatus constructed in accordance with my invention, and Fig. 4 is a sectional detail view of the protecting-gasket.

In the manufacture of glass articles by pressing a blank and then blowing it by a subsequent operation into the form of the finished article there is a limit to the size in which the articles can be made, and if this size be exceeded the original blank, being large, will be of ununiform temperature and will blow out unevenly in certain places, so as to prevent the expansion of the glass in the necessary manner. My invention overcomes this difficulty and enables glass articles of large size to be made in this manner.

In the practice of my invention I press or form a glass blank in a preliminary mold, then transfer it to a second larger mold-cavity or otherwise bring the larger mold-cavity in direct relation to the glass blank and subject the glass blank to heat while in such position. When the blank has thus been properly heated, I subject it to air-pressure and expand it to the desired form. The novelty of this operation consists mainly in the heating of the blank while in position on the blow-mold.

In the accompanying drawings, 2 represents a press-mold in which the blank is formed, and 3 is a plunger which is operated by any suitable mechanism, and 4 5 are rings on the mold. The plunger is brought down upon the glass inserted in the cavity of the mold 2 and the glass is pressed thereby, so as to form a blank B. The plunger and the ring 4 are then removed and the ring 5, which is so shaped as to fit the top edge of the blank B, is lifted, together with the blank, and is placed upon a blow-mold 6. A head 7, which is preferably associated with the mold-cover 8, is then brought down by means of suitable mechanism, such as a rack 9 and pinion 10, operated by a hand-wheel or an equivalent, so that it will be in proximity to the blank B, and a mixture of gas and air, which may be mixed in a reservoir 11, is admitted into the head 7 and is ignited, the flame passing down from the mouth of the head 7 impinging upon the blank and escaping laterally under the edges of the cover 8. The heat of the flame will quickly soften the glass, and when it has acquired the proper temperature the gas is shut off, the mold-cover 8 is brought down on the mold so as to close the same, as shown in Fig. 3, and air is blown in through the head 7, so as to expand the blank B and to cause it to fill the mold 6. As a means of blocking the blank to the blow-mold and to hold it firmly during the blowing I prefer to use a ring 12, which may be faced with asbestos. This ring will not only serve to hold the blank during the blowing operation, but will also protect the edges of the blank from the flame, as the edges of the blank need not be changed in shape, and consequently need not be heated. The mold may also be provided with a vertically-movable bottom piece 13, operated by a lever 14 or otherwise to assist in dislodging the finished article from the mold. The press-mold may be made in one part or several parts and the blank may be pressed as a flat blank or a hollow one.

Within the scope of my invention as defined in the claims modifications may be made in the construction of the apparatus and in the steps of the method, since

What I claim is—

1. The method herein described of making hollow articles of glassware, which consists in forming a blank, bringing the blank into operative relation with a blow-mold, circulating hot currents through the hollow blank while in such relation, and then expanding the blank within said blow-mold.

2. The method herein described of making hollow articles of glassware, which consists in forming a blank, bringing the blank into operative relation with a blow-mold, heating the interior of the blank by a flame while in such relation, and then expanding the same by blowing and holding the edges of the blank in position during the blowing.

3. The method herein described of making hollow articles of glassware, which consists in forming a blank, bringing the blank into operative relation with a blow-mold, protecting the edges of the blank, heating the blank when in such relation by circulating hot currents through it and then expanding the same.

4. In the manufacture of hollow glass articles, the steps consisting in bringing the hollow blank into operative relation with the mold, heating the interior of the blank while in such position by driving air and gas through an admission-pipe, and igniting the mixture within the blank, and then cutting off the gas and forcing in air through the same pipe, to expand the blank; substantially as described.

5. The method of making hollow glass articles, consisting in forming a blank, bringing the blank into operative relation with the blow-mold, driving an igniting-current of gas and air in the blank while in such relation, and then closing the top of the mold and driving air alone in through the same tube to expand the blank; substantially as described.

6. Apparatus for the manufacture of glassware, comprising a blow-mold having a removable head, a mold-cover, and means for introducing a flame into the mold through the head.

7. Apparatus for the manufacture of glassware, comprising a blow-mold having a removable head, a mold-cover, means for introducing a flame into the mold through the head, and means for bringing the cover upon the mold and introducing air into the mold.

In testimony whereof I have hereunto set my hand.

DANIEL C. RIPLEY.

Witnesses:
THOMAS W. BAKEWELL,
A. E. WALLACE.